United States Patent
Kang et al.

(10) Patent No.: US 10,533,637 B2
(45) Date of Patent: Jan. 14, 2020

(54) MULTIPLE HYDRAULIC MULTI-PLATE CLUTCH TRANSMISSION FOR VEHICLE

(71) Applicants: Myungkoo Kang, Busan (KR); Seungmo Kang, Busan (KR)

(72) Inventors: Myungkoo Kang, Busan (KR); Seungmo Kang, Busan (KR)

( * ) Notice: Subject to any disclaimer, the term of this patent is extended or adjusted under 35 U.S.C. 154(b) by 153 days.

(21) Appl. No.: 14/434,961

(22) PCT Filed: Oct. 10, 2013

(86) PCT No.: PCT/KR2013/009054
§ 371 (c)(1),
(2) Date: Apr. 10, 2015

(87) PCT Pub. No.: WO2014/058239
PCT Pub. Date: Apr. 17, 2014

(65) Prior Publication Data
US 2015/0260262 A1 Sep. 17, 2015

(30) Foreign Application Priority Data

Oct. 12, 2012 (KR) .................. 10-2012-0113578

(51) Int. Cl.
*F16H 3/093* (2006.01)
*F16H 3/00* (2006.01)
*F16H 3/097* (2006.01)

(52) U.S. Cl.
CPC ............. *F16H 3/006* (2013.01); *F16H 3/097* (2013.01); *F16H 2003/0931* (2013.01); *Y10T 74/19223* (2015.01)

(58) Field of Classification Search
CPC . F16H 3/006; F16H 3/08; F16H 3/097; F16H 2003/0931; F16H 2200/006; F16H 2200/0065

(Continued)

(56) References Cited

U.S. PATENT DOCUMENTS 3,537,335 A * 11/1970 Aizpiri Ezpeleta ........................ B60W 30/1819
477/123
4,152,949 A * 5/1979 Vandervoort ........... F16H 3/095
74/331

(Continued)

FOREIGN PATENT DOCUMENTS

| JP | 2008-64216 | 3/2008 |
| JP | 2008-520922 | 6/2008 |

(Continued)

OTHER PUBLICATIONS

International Search Report for International Application No. PCT/KR2013/009054, dated Jan. 23, 2014.

(Continued)

*Primary Examiner* — William C Joyce
(74) *Attorney, Agent, or Firm* — Kile Park Reed & Houtteman PLLC

(57) ABSTRACT

A multiple hydraulic multi-plate clutch transmission includes an input shaft (IS); hydraulic multi-plate clutches arranged on the input shaft and each engaged with or disengaged from the input shaft; one or more drive gears (G) provided on each hydraulic multi-plate clutch; first and second output shafts (OS1) and (OS2) disposed parallel to the input shaft (IS); speed gears (D) provided on the first or second output shaft and engaging with any one of the drive gears; and gear selectors (S) provided between some of the speed gears of the first and second output shaft and each always connected to the corresponding speed gear and disposed such that no neutral disengaged state is present. At least three speed gears of one or more higher and one or more lower gear stages than a gear stage associated during driving are maintained in a pre-selected state so as to prepare acceleration or deceleration.

2 Claims, 6 Drawing Sheets

(58) Field of Classification Search
USPC .................................................. 74/330, 331
See application file for complete search history.

(56) References Cited

U.S. PATENT DOCUMENTS

| | | | | | |
|---|---|---|---|---|---|
| 4,275,608 | A | * | 6/1981 | Brancolini | F16H 3/08 |
| | | | | | 475/207 |
| 4,388,838 | A | * | 6/1983 | Richards | F16H 3/095 |
| | | | | | 74/331 |
| 4,481,836 | A | * | 11/1984 | Richards | F16H 3/095 |
| | | | | | 192/48.91 |
| 4,488,446 | A | * | 12/1984 | Nishikawa | F16H 3/089 |
| | | | | | 74/330 |
| 5,193,417 | A | * | 3/1993 | Niiyama | F16H 3/10 |
| | | | | | 192/222 |
| 5,603,241 | A | * | 2/1997 | Umeyama | F16H 3/089 |
| | | | | | 74/325 |
| 6,095,001 | A | * | 8/2000 | Ruehle | F16H 3/006 |
| | | | | | 74/331 |
| 6,604,438 | B2 | * | 8/2003 | Ruhle | B60W 10/02 |
| | | | | | 74/335 |
| 6,905,439 | B2 | * | 6/2005 | Dreibholz | B60W 10/02 |
| | | | | | 477/174 |
| 7,552,658 | B2 | | 6/2009 | Forsyth | |
| 2002/0033059 | A1 | | 3/2002 | Pels et al. | |
| 2007/0277633 | A1 | | 12/2007 | Burgardt et al. | |
| 2012/0160044 | A1 | * | 6/2012 | Kahl | F16H 3/006 |
| | | | | | 74/330 |

FOREIGN PATENT DOCUMENTS

| | | |
|---|---|---|
| KR | 10-2005-0042671 | 5/2005 |
| KR | 10-2007-0116992 | 12/2007 |
| WO | 2006/056325 | 6/2006 |

OTHER PUBLICATIONS

Written Opinion of the International Searching Authority with English Translation, for International Application No. PCT/KR2013/009054, dated Jan. 23, 2014.

International Preliminary Report on Patentability for International Application No. PCT/KR2013/009054, dated Apr. 14, 2015.

* cited by examiner

[Fig. 1]
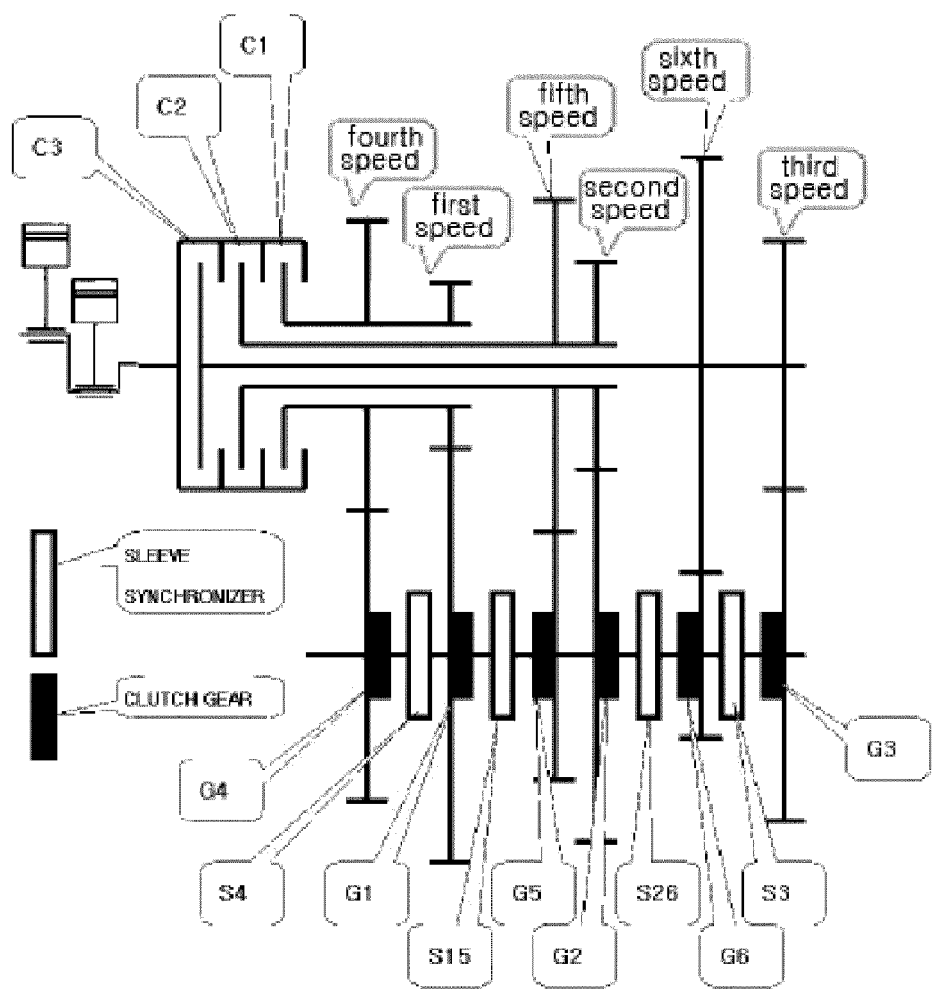

[Fig. 2]
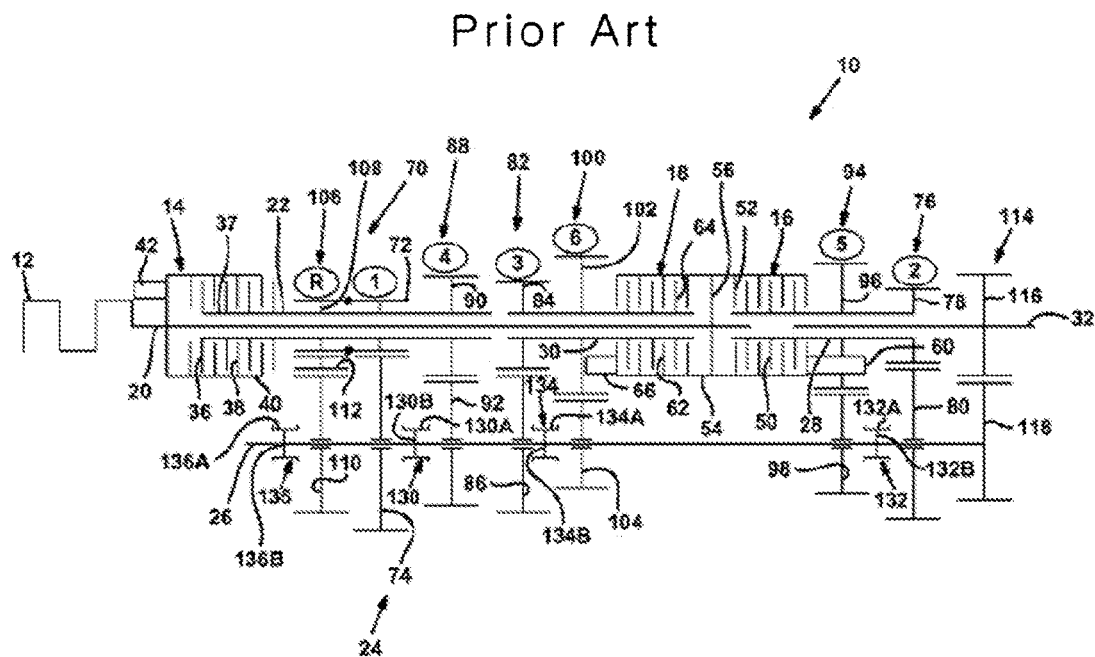
[Fig. 3]

MULTIPLE HYDRAULIC MULTI-PLATE CLUTCH TRANSMISSION FOR VEHICLE

TECHNICAL FIELD

The present invention generally relates to transmission structures for vehicles. More particularly, the present invention relates to a transmission with a plurality of hydraulic multi-plate clutches that is configured such that, compared to conventional transmissions, shift efficiency can be improved, shift control can be rapidly and easily conducted, and smooth sequential shifting and skip shifting can be performed during acceleration or deceleration of a vehicle.

BACKGROUND ART

Clutches for controlling power are classified into a wet clutch, a dry clutch, a conical clutch, a magnetic clutch, a dog tooth clutch, etc.

Recently, vehicles with coaxial dual clutches were introduced. Dual clutch transmissions (DCT) refer to a transmission whereby two clutches are disposed in the front of the transmission and selectively and successively operated so that shift time can be markedly reduced. Such dual clutch transmissions are an evolution of automated manual transmissions and are presently in the limelight because they have as high economic feasibility as manual transmissions, can reduce power loss and enhance power efficiency, and can realize rapid shifting and thus provide a sporty driving experience.

Well known dual clutch transmissions are advantageous in that the performance thereof is excellent whereby, when a vehicle accelerates, a speed gear of a higher stage than a current speed gear is pre-selected to make shifting to a higher gear stage rapidly, and when the vehicle decelerates, a speed gear of a lower stage than a current speed gear is pre-selected and thus engine braking occurs. However, when the vehicle is moving at a constant speed or repeats acceleration and deceleration, it is difficult to control and determine whether having to pre-select a speed gear of a higher stage than a current speed gear or a speed gear of a lower stage than.

Furthermore, in the known dual clutch transmissions, although it is easy to shift gears from an even gear stage to an odd gear stage or from an odd gear stage to an even gear stage, it is impossible to conduct skip shifting whereby gears are shifted from an even gear stage to another even gear stage or from an odd gear stage to another odd gear stage. Such skip shifting is widely used for rapid acceleration and, particularly, requires a rapid and smooth shifting response.

Therefore, some people are of the opinion that there is need for a transmission with at least three clutches. In other words, a transmission is required wherein one or more gear stages higher and one or more gear stages lower than an engaged speed gear must always be pre-selected.

FIG. 1 is a schematic view showing the configuration of a gear train of a triple clutch transmission according to a conventional technique. FIG. 2 is a schematic view showing the configuration of a gear train of a triple clutch transmission according to another conventional technique. FIG. 1 illustrates Korean Patent Unexamined Publication No. 10-2005-0042671, entitled "TRIPLE CLUTCH TRANSMISSION". FIG. 2 shows U.S. Pat. No. 7,552,658B2, entitled "THREE CLUTCH POWERSHIFT TRANSMISSION". The former is configured such that three shafts are coaxially provided, wherein a first shaft that is a basic input shaft is provided, a second shaft that is a hollow shaft is provided around the outer surface of the first shaft, a third shaft that is a hollow shaft is provided around the outer surface of the second shaft, and speed gears are provided on each shaft. Furthermore, first to third clutches C1 to C3 are connected to the shafts so as to control transmission of power.

This triple clutch transmission overcomes the above-mentioned disadvantages of dual clutches and is configured such that gears one stage higher and one stage lower than a current gear stage are pre-selected, whereby smooth sequential shifting can be realized, and skip shifting can be more easily conducted.

However, it is very difficult to form the coaxial shaft structure. In addition, the production cost is increased, and repair and maintenance are difficult. Furthermore, if the number of gear stages is increased to seven or more stages, the structure of the transmission is further complicated. Moreover, it is not easy to control the transmission because of characteristics in which gear selectors (synchro devices) are operated at three positions including left, neutral, and right positions.

The latter, that is, the technique of the US patent, also pertains to a triple clutch transmission. However, unlike the above conventional technique, first to third hollow shafts 22, 28, and 30 are coaxially provided around an outer surface of a first shaft 20 that is an input shaft, and first to third hydraulic clutches 14, 16, and 18 are provided on the respective hollow shafts such that transmission of power is separately controlled.

This transmission structure can overcome the disadvantages of the dual clutch whereby sequential shifting or skip shifting can be conducted during acceleration or deceleration of the vehicle. However, as shown in the drawing, the structure of the gear train is also very complex. Thus, there are still problems of a complex manufacturing process and difficult maintenance and repair.

Furthermore, the speed gears of six gear stages are arranged in a line on the first to third hollow shafts without use of a gear selector. Therefore, it is difficult to apply this technique to a transmission with seven or more gear stages. Thus, this conventional technique cannot meet recent trends of subdividing the gear stages and increasing the number of gear stages.

DISCLOSURE

Technical Problem

Accordingly, the present invention has been made keeping in mind the above problems occurring in the prior art, and an object of the present invention is to provide a multiple hydraulic multi-plate clutch transmission in which a plurality of hydraulic multi-plate clutches are provided on a single input shaft, and each hydraulic multi-plate clutch is configured such that at least one or more speed gears provided on a pair of output shafts can always engage with the hydraulic multi-plate clutch, and each hydraulic multi-plate clutch and a corresponding gear selector can be directly turned on or off without being in a separate neutral position, whereby shift time and shift shock can be reduced, and it is possible to increase the number of gear stages.

Technical Solution

In order to accomplish the above object, the present invention provides a multiple hydraulic multi-plate clutch transmission for a vehicle, including: an input shaft (IS)

configured to be rotated by an engine or a drive motor; at least four hydraulic multi-plate clutches (WC) arranged in a line on the input shaft at positions spaced apart from each other in a longitudinal axial direction of the input shaft, each of the hydraulic multi-plate clutches being engaged with or disengaged from the input shaft; a plurality of drive gears (G) provided on each of the hydraulic multi-plate clutches (WC); an output shaft (OS); a plurality of speed gears (D) engaging with any one of the drive gears (G); and a plurality of selectors (S). The output shaft (OS) includes a first output shaft (OS1) and a second output shaft (OS2) respectively disposed below, above, and parallel to the input shaft (IS). An operation unit for transmitting power to either the first output shaft (OS1) or the second output shaft (OS2) includes: two hydraulic multi-plate clutches (WC) successively arranged facing each other; a pair of drive gears (G) provided on each of the hydraulic multi-plate clutches (WC); four speed gears (D) engaging with the corresponding drive gears (G); and two gear selectors (S) provided between the speed gears so as to selectively transmit power to either the first output shaft (OS1) or the second output shaft (OS2). The pair of drive gears (G) provided on each of the hydraulic multi-plate clutches (WC) is made of a combination of drive gears of gear stages that are not successive to each other, the pair of drive gears (G) being configured to be successive to gear stages of another pair of drive gears of an adjacent hydraulic multi-plate clutch, wherein a first drive gear of each pair of drive gears is interlocked with the first output shaft (OS1), and a second drive gear of the pair of drive gears is interlocked with the second output shaft (OS2). Two of the speed gears (D) respectively engage with the two drive gears interlocked to the first output shaft (OS1), and the other two of the speed gears (D) respectively engage with the two drive gears interlocked to the second output shaft (OS2). One of the gear selectors (S) is connected to the two corresponding speed gears (D) of the different hydraulic multi-plate clutches and disposed between the two speed gears interlocked with the first output shaft (OS1), and the other one of the gear selectors (S) is connected to the two corresponding speed gears (D) of the different hydraulic multi-plate clutches and disposed between the two speed gears interlocked with the second output shaft (OS2), wherein when a signal is input, any one selected from between the two gear selectors is connected to a corresponding one of the hydraulic multi-plate clutches such that power is output via one of the first output shaft (OS1) and the second output shaft (OS2) while the other one of the first output shaft (OS1) and the second output shaft (OS2) is pre-selected to prepare for acceleration or deceleration.

Advantageous Effects

According to the present invention, a combination of hydraulic multi-plate clutches and gear selectors can further subdivide gear stages, increase the number of gear stages, and prevent a problem whereby the structure of the transmission is complicated and the size and volume thereof are increased as the number of gear stages are increased.

Furthermore, at least one or more speed gears are provided on each hydraulic multi-plate clutch. Selection of the speed gears is conducted by turning on or off the corresponding hydraulic multi-plate clutches and the associated gear selectors that are provided in minimal number, whereby shift time is reduced, and the operation of shifting gears from a current driving gear stage to a higher or lower gear stage can be facilitated.

Particularly, if each hydraulic multi-plate clutch has an electric hydraulic structure, control of transmission of power can be conducted immediately by turning current on or off. In addition, the selectors are controlled only at two ON and OFF positions without being at a neutral position. Thus, the control of the transmission can be facilitated, and there is low possibility of malfunction of the transmission. Therefore, the reliability of the transmission can be enhanced.

Moreover, in the transmission structure according to the present invention, not only sequential shifting but also skip shifting can be smoothly conducted during acceleration or deceleration of the vehicle, particularly, during acceleration. Consequently, shift time and shift shock can be markedly reduced.

DESCRIPTION OF DRAWINGS

FIG. 1 is a schematic view showing the configuration of a gear train of a triple clutch transmission according to a conventional technique;

FIG. 2 is a schematic view showing the configuration of a gear train of a triple clutch transmission according to another conventional technique;

FIG. 3 is a plan view of a gear train of a multiple hydraulic multi-plate clutch transmission according to a first embodiment of the present invention;

DESCRIPTION OF THE ELEMENTS IN THE DRAWINGS

Figure 4:
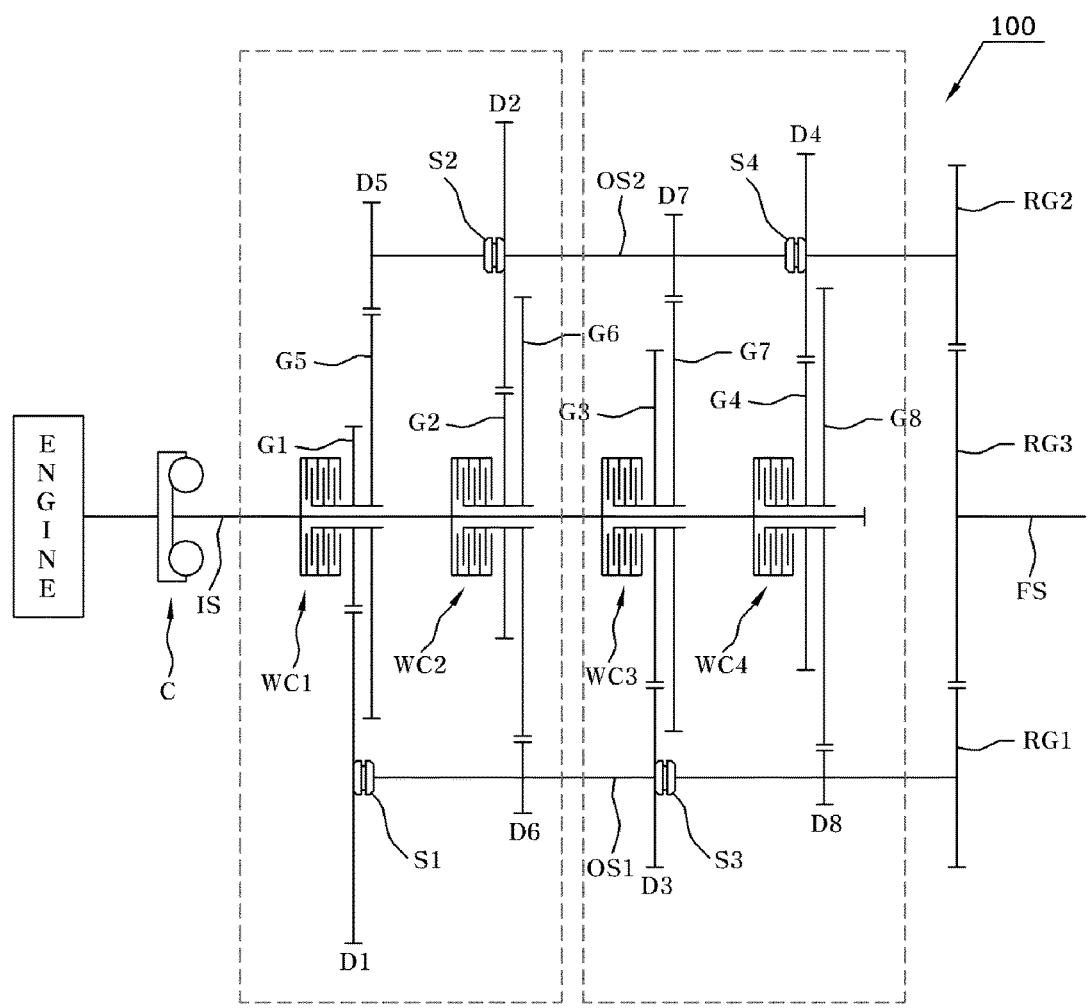
FIG. 4 is a plan view of a gear train of a multiple hydraulic multi-plate clutch transmission according to a second embodiment of the present invention.

C: main clutch IS: input shaft
OS1: first output shaft OS2: second output shaft
FS: driven shaft
WC1~WC6: hydraulic multi-plate clutch
G1~G12: drive gear D1~D11: speed gear
RG1~RG3: driven gear S1~S6: selector

BEST MODE

Hereinafter, the construction and operation principle of the present invention will be described with reference to the attached drawings.

FIG. 3 is a plan view of a gear train of a multiple hydraulic multi-plate clutch transmission according to a first embodiment of the present invention that has a power transmission and gearshift structure adapted for application to electric vehicles, fuel cell vehicles, and series hybrid vehicles. The present invention has, as one unit, an operation unit including: two hydraulic multi-plate clutches WC that are successively arranged facing each other; a pair of drive gears G provided on each hydraulic multi-plate clutch WC; four speed gears D each engaging with the corresponding drive gears G; and two gear selectors S provided between the speed gears so as to selectively transmit output to either the first output shaft or the second output shaft. This embodiment illustrates an example including a single operation unit (designated by the dotted line).

First and second output shafts OS1 and OS2 are respectively disposed below, above and parallel to an input shaft IS that receives rotational force from a drive motor (not shown).

First to fourth hydraulic multi-plate clutches WC1 to WC4 are arranged on the input shaft IS in a longitudinal axial direction thereof.

Each of the hydraulic multi-plate clutches WC1 to WC4 provided on the input shaft IS is provided with one or two drive gears G1 to G6. The drive gears of each operation unit designated by the dotted line are provided as a pair. Each pair of drive gears is made of a combination of drive gears that are not successive to each other and configured to be connected to another pair of drive gears of an adjacent hydraulic multi-plate clutch. Preferably, a first drive gear of each pair of drive gears is interlocked to the first output shaft OS1, and a second drive gear thereof is interlocked to the second output shaft OS2. For this, in the drawing, an example is illustrated whereby the first hydraulic multi-plate clutch WC1 is provided with the first drive gear G1 and the fifth drive gear G5, the second hydraulic multi-plate clutch WC2 is provided with the second drive gear G2 and the sixth drive gear G6, the third hydraulic multi-plate clutch WC3 is provided with the third drive gear G3, and the fourth hydraulic multi-plate clutch WC4 is provided with the fourth drive gear G4.

The first to sixth drive gears G1 to G6 differ from each other in the diameter and the number of gear teeth thereof to allow for control of a gear ratio (speed ratio) with speed gears D1 to D6, which will be explained later herein.

The first drive gear G1 and the fifth drive gear G5 respectively engage with the first speed gear D1 provided on the first output shaft OS1 and the fifth speed gear D5 provided on the second output shaft OS2.

The second drive gear G2 and the sixth drive gear G6 respectively engage with the second speed gear D2 provided on the second output shaft OS2 and the sixth speed gear D6 provided on the first output shaft OS1.

The third drive gear G3 engages with the third speed gear D3 provided on the first output shaft OS1. The fourth drive gear G4 engages with the fourth speed gear D4 provided on the first output shaft OS1.

On the input shaft IS, the first to fourth hydraulic multi-plate clutches WC1 to WC4 are arranged in sequence along the longitudinal axis of the input shaft IS in a direction opposite to a direction in which power is input to the input shaft IS. On the first output shaft OS1, the first speed gear D1, the sixth speed gear D6, the third speed gear D3, and the fourth speed gear D4 are arranged in sequence.

Furthermore, the fifth speed gear D5 and the second speed gear D2 are arranged in sequence on the second output shaft OS2.

The third speed gear D3 and the fourth speed gear D4 are selectively provided on either the first output shaft OS1 or the second output shaft OS2.

A first driven gear RG1 and a second driven gear RG2 are respectively provided on rear portions of the first and second output shafts OS1 and OS2 so as to allow for power transmission therebetween. The first driven gear RG1 and the second driven gear RG2 each engage with a third driven gear RG3.

Rotational force transmitted to the driven gears RG1 and RG2 is transmitted to wheels via a driven shaft FS on which the third driven gear RG3 is installed.

Two gear selectors S1 and S2 are mounted on the first output shaft OS1 and the second output shaft OS2 so as to select speed gears to be associated with power transmission. In this embodiment, the first selector S1 is disposed between the first speed gear D1 and the sixth speed gear D6 that are provided on the first output shaft OS1. The second selector S2 is disposed between the fifth speed gear D5 and the second speed gear D2 that are provided on the second output shaft OS2. The first and second selectors S1 and S2 are dependently controlled by a single actuator (not shown) provided in the corresponding operation unit.

The gear selector S1 or S2 typically called a synchro device is a kind of clutch, which synchronizes the RPM of a speed gear on an output shaft with a drive gear and thereby controls connection or interruption of power and is controlled by an actuator. Such gear selectors are well known techniques, which have been already widely used in various vehicles; therefore, a detailed explanation thereof will be omitted.

The operation principle of the multiple hydraulic multi-plate clutch transmission 100 having the above-mentioned construction will be described as follows.

For example, in the case of electric vehicles, the drive motor starts the rotation of the input shaft IS, whereby current is applied in advance to the first hydraulic multi-plate clutch WC1 so that power connection of the first hydraulic multi-plate clutch WC1 provided with the first drive gear G1 to the input shaft IS is made. Furthermore, the connection of the first selector S1 to the first speed gear D1 is retained.

Therefore, along with the rotation of the input shaft IS, the first drive gear G1 and the first speed gear D1 also rotate, whereby rotational force that has been subjected to gear shifting is transmitted to the driven shaft FS via the first driven gear RG1 and the third driven gear RG3.

While the first speed gear D1 is selected and rotated, the second speed gear D2 that refers to a sequent gear stage is retained in a pre-selected state whereby it is pre-selected by the second selector S2. That is, when the first selector S1 is connected to the first speed gear D1, the second selector S2 is dependently controlled by the actuator such that it selects the second speed gear D2 simultaneously with the connection of the first selector S1 to the first speed gear D1. The reason for having the above-mentioned construction is because if the selectors are not dependently controlled, they may simultaneously engage with the same hydraulic multi-late clutch and thus cause damage to the transmission.

Generally, due to the characteristics of drive motors, electric vehicles have no use for a transmission and thus do not require a clutch. The reason for this is because the drive motors can generate the maximum allowable torque even when the rotation thereof begins. Thus, most electric vehicles use a single gear transmission.

However, despite the foregoing, according to significant research, it is more preferable in terms of fuel efficiency that at least four or more speed gears be used in a drive motor. Given this, recently, a variety of transmissions for electric vehicles have been developed and introduced.

As in this embodiment, use of a plurality of hydraulic multi-plate clutches WC1 to WC4 can realize an ideal transmission for electric vehicles.

In the transmission of this embodiment, the two output shafts OS1 and OS2 are disposed below, above and parallel to the input shaft IS, thus making it possible to increase the number of speed gears. In addition, the two drive gears G are provided on each hydraulic multi-plate clutch and each selector S1, S2 is provided between the associated hydraulic multi-plate clutches so that space required for the operation of the selectors can be minimized. Furthermore, power connection is dependently selected by the selectors S1 and S2. Therefore, even when use is made of a large number of speed gears, the number of hydraulic multi-plate clutches can be minimized, and the volume of the transmission can be reduced.

In this embodiment, a six speed transmission is realized by means of the four hydraulic multi-plate clutches WC1 to WC4 and the two selectors S1 and S2. Such a transmission structure is adapted for application to a low-speed and high-torque drive motor. While an engine is in an ignition-off state, the power connection of all of the hydraulic multi-plate clutches is interrupted, and the elements are stopped without rotating.

When a switch is turned on and a gearshift lever is put into a drive gear stage, the first hydraulic multi-plate clutch WC1 associated with the first speed gear D1 is simultaneously connected to the input shaft IS with application of current before rotation for start. Thereby, before starting, the maximum allowable torque can be provided without frictional loss.

Typical clutches are in a disengaged state rather than being in an engaged state before rotation of an input shaft for starting, and after the input shaft begins to rotate, the clutch is engaged so that the vehicle begins to move. Unlike this, in the case of the drive motor, the clutch of a first gear stage is engaged just before starting, whereby the most of the allowable torque given to the first clutch can be used.

After the vehicle starts at first speed, if the speed thereof increases to a predetermined degree and the torque thereof remains, the supply of current to the first hydraulic multi-plate clutch WC1 is interrupted, and current is applied to the second hydraulic multi-plate clutch WC2 for power connection.

In this embodiment, because electricity can be used to control turning on or off the hydraulic multi-plate clutches WC, engagement and disengagement of the clutch can be rapidly and precisely performed. Although the four hydraulic multi-plate clutches are connected to the single input shaft IS and are rotated thereon, only a single hydraulic multi-plate clutch is connected to the input shaft IS that is rotating at a point of time during driving of the vehicle. In other words, at a point of time during driving of the vehicle, current is applied to only a single hydraulic multi-plate clutch via a relay switch. Therefore, there is no possibility of a plurality of clutches simultaneously engaging with the input shaft.

During driving of the vehicle, a speed gear higher by one stage than a current gear stage and a speed gear lower by one stage than the current gear stage must be pre-selected so as to reduce shift time and shift shock. Therefore, as shown in the drawings, there is need for at least four hydraulic multi-plate clutches WC1 to WC4. Furthermore, to achieve the above purpose, the speed gears of the gear stages are preferably alternately provided on the first and second output shaft OS1 and OS2 rather than being arranged in sequence of the gear stages. In this way, when the four hydraulic multi-plate clutches are used as shown in the drawings, six or more gear stages can be embodied.

Although, as in electric vehicles, there may be no need for increasing the number of gear stages to six or more gear stages to increase the gear speed ratio, the change of the gear ratio from a first speed to a sixth speed can be smoother because the gears are dense. In this construction, there is an advantage in that the transmission becomes almost similar to a continuous variable transmission (CVT).

In the case of the present invention, when the vehicle that has been stopped starts to move, the first to fourth speeds can be pre-selected and pre-engaged. Therefore, there is no need for separate selector operation, and it is sufficient if current for operation of a clutch can be applied to only one of clutches at a point of time during driving. This can be accepted as being useful in that current consumption required to operate the transmission is minimized.

In the present invention, the following other embodiments other than the first embodiment are also characterized in that at least four hydraulic multi-plate clutches WC are provided on the input shaft. Only then can at least four speed gears including a current gear stage and preceding and following gear stages be pre-selected such that gear shifting can be rapidly conducted without shift shock and a skip shifting can be performed during acceleration.

For instance, if the fourth speed gear D4 referring to the fourth gear stage is selected and being driven, the second speed gear D1, the third speed gear D3 and the fifth speed gear D5 are pre-selected. As the vehicle accelerates or decelerates, the fifth speed gear D5 or the third speed gear D3 is selected and operated simultaneously with application of current to the first hydraulic multi-plate clutch WC1 or the third hydraulic multi-plate clutch WC3, without time delay. Therefore, there is no shift shock, and shift time is markedly reduced.

FIG. 4 is a plan view of a gear train of a multiple hydraulic multi-plate clutch transmission according to a second embodiment of the present invention. This embodiment can be applied to an internal combustion engine vehicle or a parallel mild hybrid vehicle in which a drive motor only assists the output of an engine without having a an independent driving section. This embodiment includes two operation units unlike that of the foregoing embodiment. That is, each operation unit includes two hydraulic multi-plate clutches, a combination of a pair of drive gears provided on each hydraulic multi-plate clutch, four speed gears engaging with the corresponding drive gears, and two gear selectors provided between the speed gears.

A main clutch C such as a torque converter is provided on an input shaft IS that receives rotational force from an engine. The transmission including a plurality of hydraulic multi-plate clutches WC1 to WC4 is disposed behind the main clutch C.

The main clutch C may be any one selected from among a dry friction clutch, a wet multi-plate friction clutch, and a torque converter.

The constructions of the input shaft IS, a pair of output shafts OS1 and OS2 that are disposed parallel to the input shaft IS at positions spaced apart therefrom, first to third driven gears RG1 to RG3, and a driven shaft FS are the same as those of the preceding embodiment.

Furthermore, the configuration of first to fourth hydraulic multi-plate clutches WC1 to WC4 arranged on the input shaft IS in a line in the longitudinal axis thereof from a front end thereof to a rear end is also the same as that of the preceding embodiment.

However, unlike the preceding embodiment, in this embodiment, each of the hydraulic multi-plate clutches WC1 to WC4 is provided with two drive gears G so that gear shift ratios of eight gear stages other than reverse gear ratios can be provided.

A first drive gear G1 and a fifth drive gear G5 are provided on the first hydraulic multi-plate clutch WC1 of a first operation unit (designated by the left dotted line box) and respectively engage with a first speed gear D1 and a fifth speed gear D5. A second drive gear G2 and a sixth drive gear G6 are provided on the second hydraulic multi-plate clutch WC2 and respectively engage with a second speed gear D2 and a sixth speed gear D6. As can be understood from the structure of the combination of the drive gears, the two drive gears of each hydraulic multi-plate clutch are preferably configured such that they are not successive to each other but are connected to another pair of drive gears of an adjacent hydraulic multi-plate clutch.

A third drive gear G3 and a seventh drive gear G7 are provided on the third hydraulic multi-plate clutch WC3 of a second operation unit (designated by the right dotted line box) and respectively engage with a third speed gear D3 and a seventh speed gear D7. A fourth drive gear G4 and an eighth drive gear G8 are provided on the fourth hydraulic multi-plate clutch WC4 and respectively engage with a fourth speed gear D4 and an eighth speed gear D8. The drive gear combination of the second operation unit is almost the same as that of the first operation unit. However, in this embodiment, the two operation units are present, and there is need for configuration such that the combination of the drive gears of the first operation unit is connected to the combination of the drive gears of the second operation unit.

With regard to the speed gears D, the first speed gear D1, the sixth speed gear D6, the third speed gear, and the eighth speed gear D8 are arranged on the first output shaft OS1 in sequence from the front. The fifth speed gear D5, the second speed gear D2, seventh speed gear D7, and the fourth speed gear D4 are arranged in sequence on the second output shaft OS2.

In the first operation unit, a first selector S1 is provided on the first output shaft OS1 between the first speed gear D1 and the sixth speed gear D6. In the second operation unit, a third selector S3 is provided on the first output shaft OS1 between the third speed gear D3 and the eighth speed gear D8.

Furthermore, in the first operation unit, a second selector S2 is provided on the second output shaft OS2 between the fifth speed gear D5 and the second speed gear D2. In the second operation unit, a fourth selector S4 is provided on the second output shaft OS2 between the seventh speed gear D7 and the fourth speed gear D4. The first and second selectors S1 and S2 of the first operation unit are controlled by a single actuator provided in the first operation unit. The third and fourth selectors S3 and S4 of the second operation unit are controlled by another single actuator provided in the second operation unit.

The reason for this configuration of the selectors and the speed gears is to pre-select at least three speed gears of one or more higher and one or more lower gear stages than a current-driving gear stage and thus minimize shift time and shift shock.

For internal combustion engine vehicles, when a vehicle that has been stopped starts to move, the torque of the engine thereof is comparatively low. Hence, there is need for a process of raising the RPM of the engine and increase the torque thereof to provide a soft start. Therefore, unlike electric vehicles, there is need for presence of a main clutch C such as a torque, a dry clutch, or a wet clutch ahead of the hydraulic multi-plate clutch transmission for electric vehicles. In this embodiment, the case where a torque converter is selected as the main clutch is illustrated as an example.

That is, before the vehicle starts to move, power is connected to the first hydraulic multi-plate clutch WC1 to which the first speed gear D1 is connected, whereby the engine can be maintained in a state enabling it to generate the maximum allowable torque, and the vehicle can start to move with transmission of the rotational power of the engine via the main clutch C.

Power connection to each of the speed gears D1 to D8 is conducted by means of the selectors S1 to S4 and turning on and off current applied to the first to fourth hydraulic multi-plate clutches WC1 to WC4.

For example, when the fifth speed gear D5 is selected and a fifth speed is thus embodied, current is applied to the first hydraulic multi-plate clutch WC1 so that it is turned on, and the second selector S2 becomes connected to the fifth speed gear D5.

At this time, the fourth selector S4 and the first selector S1 are respectively pre-connected to the fourth and sixth speed gears D4 and D6 that are respectively a speed gear higher by one stage and a speed gear lower by one stage than the fifth speed gear D5 that is a current driving speed gear. Furthermore, the third selector S3 is connected in advance to the third speed gear D3. In other words, while the vehicle is moving at the fifth speed, the speed gears D3, D4, and D6 corresponding to third, fourth, and sixth speeds are pre-selected.

Therefore, when the vehicle that is moving at a gear ratio of the fifth speed accelerates, current is applied to the second hydraulic multi-plate clutch WC2 so that power is connected to the sixth speed gear D6. When the vehicle decelerates, current is applied to the fourth hydraulic multi-plate clutch WC4 so that power is connected to the fourth speed gear D4.

In other words, when the vehicle is moving at the fifth speed, the third speed gear D3, the fourth speed gear D4, and the sixth speed gear D6 are respectively pre-selected by the third selector S3, the fourth selector S4, and the first selector S1.

As such, in the present invention, there is an advantage in that conversion or pre-section of the speed gears can be rapidly and reliably conducted by the electric hydraulic multi-plate clutches WC and selectors S, which can be easily controlled.

That is, according to this embodiment, two speed gears are always connected to a corresponding hydraulic multi-plate clutch. Whether power is transmitted to each speed gear or not is determined by the gear selectors S and the operation of turning on or off each hydraulic multi-plate clutch WC.

Furthermore, at a point of time a hydraulic multi-plate clutch WC engages with only a single selector S. In addition, the corresponding speed gear D disposed opposite to the engaged selector S is not connected to the corresponding selector S. Thus, the speed gear D idles while merely engaging with the hydraulic multi-plate clutch WC.

The advantage of the speed gear configuration of the embodiment shown in the drawing is that the gear selectors S engage only at two positions including a left side and a right side and there is no neutral position at which the selectors engage with the left gears or the right gears unlike the selectors of the conventional transmission. Therefore, the selectors S can be easily controlled, and the speed and reliability in controlling the selectors S can be enhanced. Furthermore, there is an advantage in that the numbers of selectors S and shafts (not shown) for controlling the selectors S can be minimized.

Well known dual clutch transmissions (DCTs) are advantageous in that the performance thereof is excellent whereby when a vehicle accelerates, a speed gear of a higher stage than a current speed gear is pre-selected to make shifting to a higher gear stage rapid, and when the vehicle accelerates, a speed gear of a lower stage than a current speed gear is pre-selected and thus engine braking occurs. However, there is a problem in that, when the vehicle is moving at a constant speed or repeats acceleration and deceleration, it is difficult to control and determine whether to pre-select a speed gear of a higher stage than a current speed gear or a speed gear of a lower stage than.

Although transmissions having the same structure as that of the above-stated triple clutch transmission have been proposed to overcome disadvantages of such dual clutches, these transmissions have the disadvantages of high production cost, difficult maintenance, and a very complex gear train structure, because a plurality of hollow pipes are coaxially configured, as described above. Moreover, it is very difficult to increase the number of gear stages to seven or more gear stages.

To overcome the above problems, in this embodiment, when the vehicle accelerates, the hydraulic multi-plate clutch WC pertaining to a current gear stage is disengaged, and a hydraulic multi-plate clutch WC that corresponds to a speed gear of a higher stage than the current gear stage by one stage is engaged. When the vehicle decelerates, the hydraulic multi-plate clutch WC pertaining to a current gear stage is disengaged, and a hydraulic multi-plate clutch WC that corresponds to a speed gear of a lower stage than the current gear stage by one stage is engaged. This operation can be realized because a speed gear of a higher gear stage than the current engaged speed gear by one stage and a speed gear of a lower gear stage than the current engaged speed gear are in the pre-selected states.

In the present invention, the speed gears are successively pre-selected and prepared by the number of hydraulic multi-plate clutches WC associated with the shift-involved gear stages including a current driving gear stage. Therefore, shifting gears can be rapidly and smoothly conducted.

Figure 5:
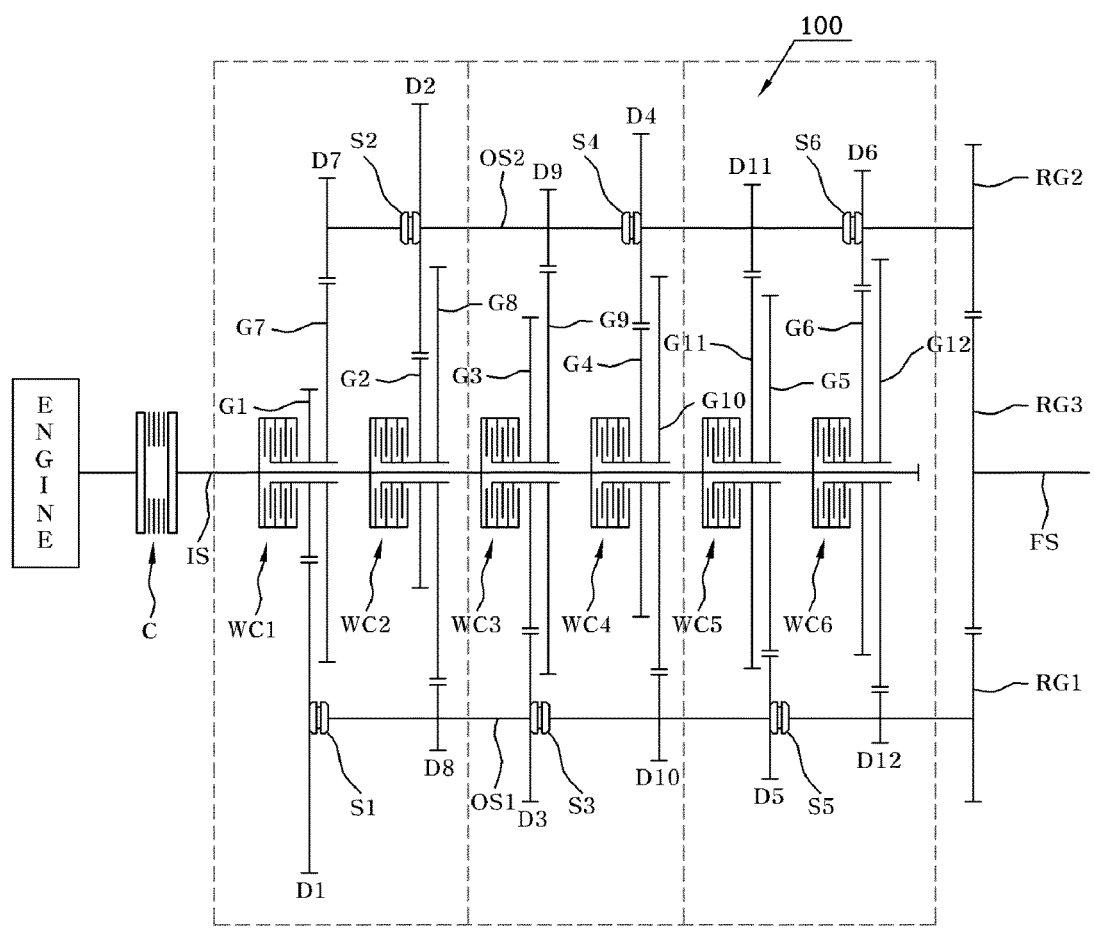
FIG. 5 is a plan view of a gear train of a multiple hydraulic multi-plate clutch transmission according to a third embodiment of the present invention.
Figure 6:
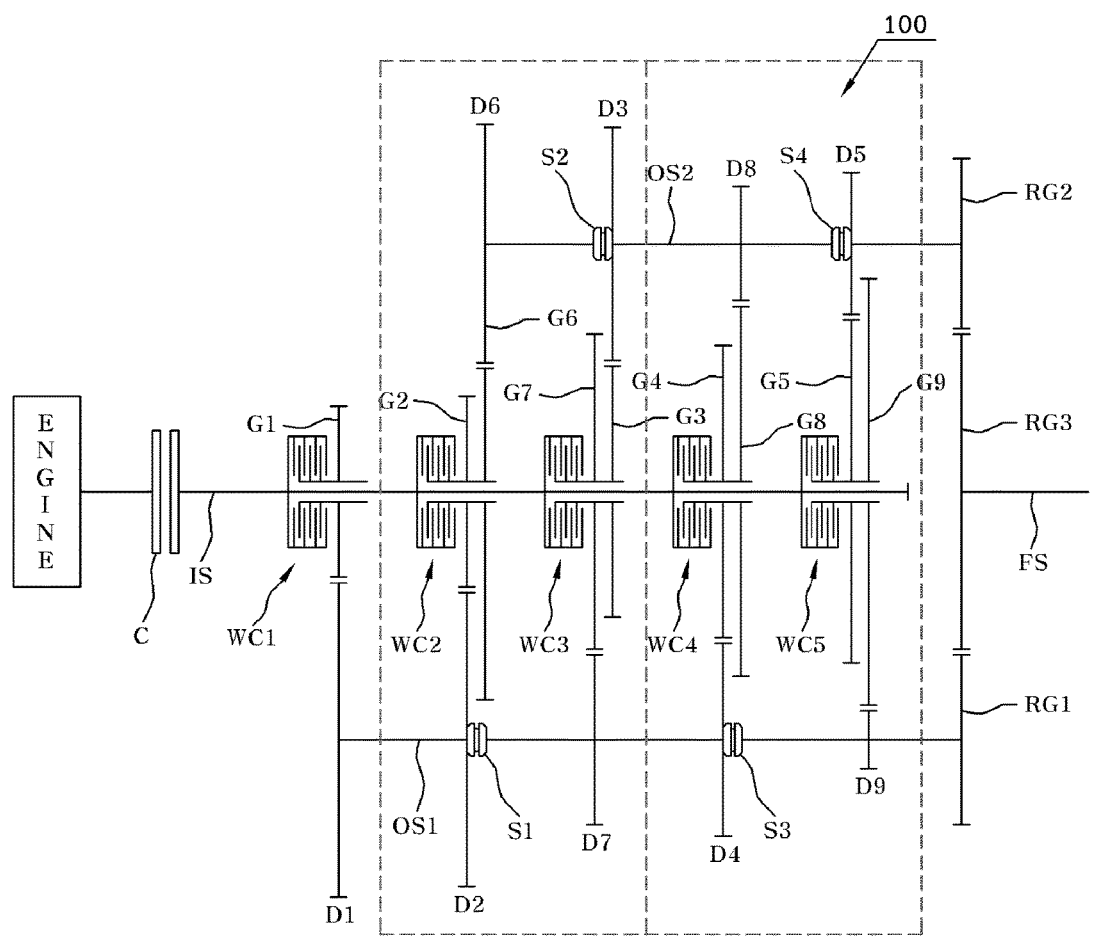
FIG. 6 is a plan view of a gear train of a multiple hydraulic multi-plate clutch transmission according to a fourth embodiment of the present invention.

FIG. 5 is a plan view of a gear train of a multiple hydraulic multi-plate clutch transmission according to a third embodiment of the present invention. FIG. 6 is a plan view of a gear train of a multiple hydraulic multi-plate clutch transmission according to a fourth embodiment of the present invention. The third and fourth embodiments respectively describe examples including three operation units and two operation units.

The general structure of the embodiment of FIG. 5 is almost the same as that of the second embodiment, but the embodiment of FIG. 5 is configured such that gear stages are further subdivided and thus the number of gear stages is further increased to twelve stages, compared to those of the second embodiment. The third embodiment illustrates an example including three operation units. In this embodiment, a total of six hydraulic multi-plate clutches WC are provided on an input shaft IS. A first speed gear D1 and an eighth speed gear D8 of the first operation unit, a third speed gear D3 and a tenth speed gear D10 of the second operation unit, a fifth speed gear D5 and a twelfth speed gear D12 of the third operation unit are arranged in sequence on a first output shaft OS1.

In this embodiment, combinations of the drive gears that engage with the associated speed gears coincide with those of the description of the foregoing embodiment. That is, the two drive gears provided on the hydraulic multi-plate clutch of each operation unit must be made of a combination of drive gears that are not successive to each other and configured to be connected to an adjacent hydraulic multi-plate clutch. In addition, as shown in detail in the drawing, the combination of the two drive gears must be connected to a combination of drive gears of each adjacent operation unit.

In the same manner as the first output shaft OS1, a seventh speed gear D7 and a second speed gear D2 of the first operation unit, a ninth speed gear D9 and a fourth speed gear D4 of the second operation unit, and an eleventh speed gear D11, and a sixth speed gear D6 of the third operation unit are arranged in sequence on a second output shaft OS2.

A first selector S1, a third selector S3, and a fifth selector S5 are respectively provided on the first output shaft OS1 between the first speed gear D1 and the eighth speed gear D8 of the first operation unit, between the third speed gear D3 and the tenth speed gear D10 of the second operation unit, and between the fifth speed gear D5 and the twelfth speed gear D12 of the third operation unit.

Likewise, a second selector S2, a fourth selector S4, and a sixth selector S6 are respectively provided on the second output shaft OS2 between the seventh speed gear D7 and the second speed gear D2 of the first operation unit, between the ninth speed gear D9 and the fourth speed gear D4 of the second operation unit, and between the eleventh speed gear D11 and the sixth speed gear D6 of the third operation unit.

The third embodiment illustrates use of a hydraulic multi-plate clutch as an example of a main clutch.

The embodiment of FIG. 6 illustrates a nine speed transmission embodied using five hydraulic multi-plate clutches WC1 to WC5 and four gear selectors S1 to S4, wherein two operation units are provided. In this embodiment, a dry friction clutch is used as a main clutch. A combination of drive gears of each operation unit, positions at which gear selectors are installed, etc. comply with the rule of the description of the foregoing embodiments.

Figure 7:
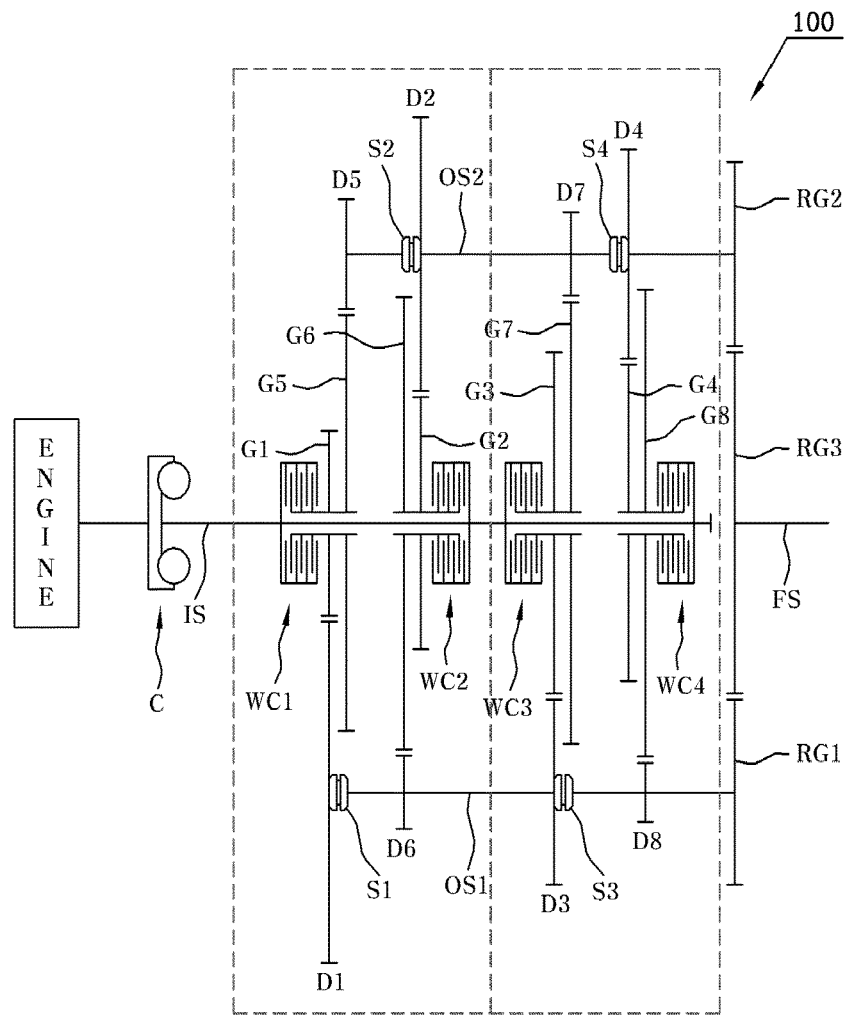
FIG. 7 is a plan view of a gear train of a multiple hydraulic multi-plate clutch transmission according to a fifth embodiment of the present invention.

FIG. 7 is a plan view of a gear train of a multiple hydraulic multi-plate clutch transmission according to a fifth embodiment of the present invention, having almost the same gear configuration as that of the second embodiment shown in FIG. 4. This embodiment includes two operation units in the same manner as that of the embodiment of FIG. 4. Furthermore, individual elements of each operation unit are disposed in accordance with the manner described in FIG. 4.

However, in this embodiment, a first hydraulic multi-plate clutch WC1 and a second hydraulic multi-plate clutch WC2 are configured such that the same elements of the first and second hydraulic multi-plate clutches WC1 and WC2 face each other. Likewise, a third hydraulic multi-plate clutch WC3 and a fourth hydraulic multi-plate clutch WC4 are configured such that the same elements of the third and fourth hydraulic multi-plate clutches WC3 and WC4 face each other. Therefore, the transmission can be reduced in volume and size, thus having a compact structure.

Such configuration, in which the adjacent two hydraulic multi-plate clutches WC are oriented such that drive gears G thereof face each other, can also be applied to the first to fourth embodiments in the same manner, and further explanation related to this will be omitted.

Figure 8:
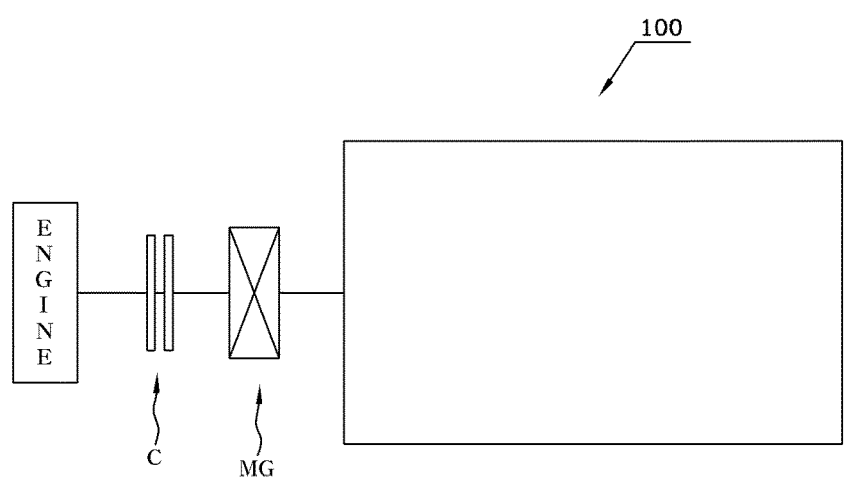
FIG. 8 is a plan view of a gear train of a multiple hydraulic multi-plate clutch transmission according to a sixth embodiment of the present invention.

FIG. 8 is a plan view of a gear train of a multiple hydraulic multi-plate clutch transmission according to a sixth embodiment of the present invention.

Of parallel hybrid vehicles, a hybrid vehicle having an independent driving section of a drive motor without the operation of an engine is called a strong parallel hybrid vehicle. In the case of such a strong parallel hybrid vehicle, a torque converter cannot be used as a main clutch C due to the independent driving section of the drive motor, and the main clutch must be made of a combination of a dry clutch and the drive motor or a combination of a wet hydraulic clutch and the drive motor.

That is, as shown in the drawing, a main clutch C controlling power transmitted from an engine and a drive motor (motor-generator, MG) connected to the main clutch C are disposed ahead of the multiple hydraulic multi-plate clutch transmission 100 of the present invention.

The operation principle of the multiple hydraulic multi-plate clutch transmission 100 according to this embodiment, other than being applied to a strong parallel hybrid vehicle in which both the engine and the drive motor are involved in power transmission, is the same as that of the preceding embodiments; therefore, detailed description thereof will be omitted.

INDUSTRIAL APPLICABILITY

As described above, the present invention relates to transmission structures for vehicles and, more particularly, to a multiple hydraulic multi-plate clutch transmission that can make control of shifting gears easy and reduce shift time and shift shock, compared to the conventional transmission, and that can subdivide the gear stages and increase the number of gear stages for different kinds of vehicle transmissions. Therefore, there is need for the present invention to be widely applied to electric vehicles, hybrid vehicles, hydrogen fuel cell vehicles, internal combustion engine vehicles, etc.

The invention claimed is:

1. A multiple hydraulic multi-plate clutch transmission for a vehicle, comprising:
    an input shaft (IS) configured to be rotated by an engine or a drive motor;
    at least four hydraulic multi-plate clutches (WC) arranged in a line on the input shaft at positions spaced apart from each other in a longitudinal axial direction of the input shaft, each of the hydraulic multi-plate clutches being engaged with or disengaged from the input shaft;
    one or more drive gears (G) provided on each of the hydraulic multi-plate clutches (WC);
    an output shaft (OS);
    a plurality of speed gears (D) engaging with any one of the drive gears (G); and
    a plurality of gear selectors (S),
    wherein the output shaft (OS) comprises a first output shaft (OS1) and a second output shaft (OS2) disposed in parallel with the input shaft (IS); and
    the multiple hydraulic multi-plate clutch transmission has at least one operation unit for transmitting power to either the first output shaft (OS1) or the second output shaft (OS2), the at least one operation unit comprising:
    first and second hydraulic multi-plate clutches successively arranged;
    first and second drive gears being disposed on the first hydraulic multi-plate clutch, and third and fourth drive gears being disposed on the second hydraulic multi-plate clutch;
    first, second, third and fourth speed gears engaging with the first, second, third and fourth drive gears, respectively; and
    first and second gear selectors provided between the first, second, third and fourth speed gears so as to selectively transmit power to either the first output shaft or the second output shaft,
    wherein the first and third drive gears are selectively interlocked with the first output shaft, and the second and fourth drive gears are selectively interlocked with the second output shaft,
    wherein the first and third speed gears respectively engage with the first and third drive gears interlocked to the first output shaft, and the second and fourth speed gears respectively engage with the second and fourth drive gears interlocked to the second output shaft,
    wherein the first gear selector is disposed between the first and third speed gears interlocked with the first output shaft, and the second gear selector is disposed between the second and fourth speed gears interlocked with the second output shaft, and
    wherein when an input signal is provided, one of the first and second gear selectors is connected to a corresponding one of the hydraulic multi-plate clutches such that power is output via one of the first output shaft and the second output shaft while the other one of the first output shaft and the second output shaft is pre-selected to prepare for acceleration or deceleration.

2. The multiple hydraulic multi-plate clutch transmission for a vehicle according to claim 1, wherein in response to the input signal, the first gear selector is connected to one of the first and third speed gears interlocked with the first output shaft, and the second gear selector is connected to one of the second and fourth speed gears interlocked with the second output shaft.

* * * * *